(12) United States Patent
Finger et al.

(10) Patent No.: US 10,567,952 B1
(45) Date of Patent: Feb. 18, 2020

(54) ESIM SUBSIDY AND OPERATIONAL MANAGEMENT

(71) Applicant: T-Mobile USA, Inc., Bellevue, WA (US)

(72) Inventors: Joshua Finger, Covington, WA (US); Gina Tran, Seattle, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/201,175

(22) Filed: Nov. 27, 2018

(51) Int. Cl.
*H04W 8/18* (2009.01)
*H04L 9/08* (2006.01)
*H04W 12/06* (2009.01)

(52) U.S. Cl.
CPC ........... *H04W 8/183* (2013.01); *H04L 9/0825* (2013.01); *H04W 12/0609* (2019.01)

(58) Field of Classification Search
CPC .......................... H04W 8/183; H04W 12/0609
USPC ...................... 455/411, 410, 414.1, 418, 558
See application file for complete search history.

(56) References Cited

U.S. PATENT DOCUMENTS

| 2010/0159887 A1* | 6/2010 | Lewis | H04L 45/04 455/412.2 |
| 2015/0110035 A1* | 4/2015 | Lee | H04W 8/183 370/329 |
| 2018/0060199 A1* | 3/2018 | Li | G06F 8/61 |

* cited by examiner

*Primary Examiner* — Nghi H Ly
(74) *Attorney, Agent, or Firm* — Han Santos, PLLC

(57) ABSTRACT

Techniques are described herein for remotely managing profiles corresponding to various mobile network operators offering telecommunication services to target user equipment based on one or more policies. An entitlement server of a mobile network operator can receive from target user equipment, a request for replacing a prioritized profile as set by the mobile network operator. The entitlement server can determine whether a user account corresponding to a device identifier for the target user equipment meets the eligibility criteria for loading a new profile onto the target user equipment. In the event of additions or replacements of profiles, the entitlement server can cause transmission of instructions to the user equipment to delete the prioritized profile and apply a new profile.

14 Claims, 3 Drawing Sheets

ESIM SUBSIDY AND OPERATIONAL MANAGEMENT

BACKGROUND

Subscriber identity module (SIM) cards enable a telecommunication service subscriber to be identified on a corresponding service provider's network by storing a unique international mobile subscriber identifier (IMSI) that can be retrieved and subsequently authenticated over-the-air by a corresponding service provider each time a user equipment engages in communications (e.g., mobile voice calling, texting, data service) with its telecommunication service provider or mobile network operator (MNO). A SIM IMSI generally includes a mobile country code (MCC), a mobile network code (MNC), and a mobile subscriber identification number (MSIN). This information allows a user's provider-issued SIM card to be identified, registered, and authenticated with an issuing MNO.

The SIM circuit is a part of the function of a universal integrated circuit card (UICC), which can be physically inserted into the SIM socket of a user equipment. Because SIM cards are static and include IMSI data that cannot be modified after issuance, a customer may be issued a different SIM card each time the customer purchases a new user equipment and/or a new service plan offering from an MNO. Upon issuance of the new SIM card, the old SIM card is removed and the new SIM card is inserted into the SIM socket of the user equipment.

In contrast, remote management of embedded UICC (eUICC) or embedded SIM (eSIM) is distinguished from physical UICC or SIM in that eUICC allows an MNO to respond to requests to change subscription from one MNO to another MNO without having physical access to the eUICC in a user equipment or terminal. Generally, eUICCs can handle multiple profiles from multiple MNOs, but only one profile can be enabled at any time in operation.

Mechanisms for over-the-air remote provisioning and management of eUICC in user equipment entail downloading new profiles, updating subscription addresses, and enabling, disabling, or deleting profiles as defined in the GMSA Remote Provisioning Architecture for eUICC Technical Specification. Particularly, subscription managers (SMs) can generate and manage a profile on a eUICC. Additionally, an SM can manage service plans or subscription change. Each SM comprises one or more profiles and a subscription manager secure routing (SM-SR) can ensure the secure transport of both eUICC platform and eUICC profile management commands in order to load, enable, disable, and delete profiles on the eUICC. Subscription managers can further comprise a subscription manager data preparation (SM-DP) or subscription manager data preparation (enhanced) (SM-DP+) for securing packaging profiles to be provisioned on the eUICC. The SM-DP or SM-DP+ manages the installation of these profiles on the eUICC.

While remote provisioning and management of eUICC enable original equipment manufacturers (OEMs) to market user equipment with straightforward connectivity experience, offering a freedom of choice of mobile subscriptions can frustrate business and marketing objectives for MNOs because SMs may not account for the MNOs' eligibility criteria for loading, enabling, disabling, or deleting profiles. For instance, MNOs may desire to discourage customers to deviate from expected service usage within a lifecycle of cellular subscriptions by acquiring unaffiliated, generic/unlocked equipment to avoid purchasing services and products from an MNO. In order to better manage client privilege and increase accountability of end user contracts by allowing MNOs to oversee SMs' management of service plans or subscription change, a validated prioritized profile that is owned by an MNO should be loaded on a targeted user equipment and/or eUICC, and eligibility criteria for modifying, deleting, adding, or replacing the profile as set forth by an MNO and/or an SM must be determined.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
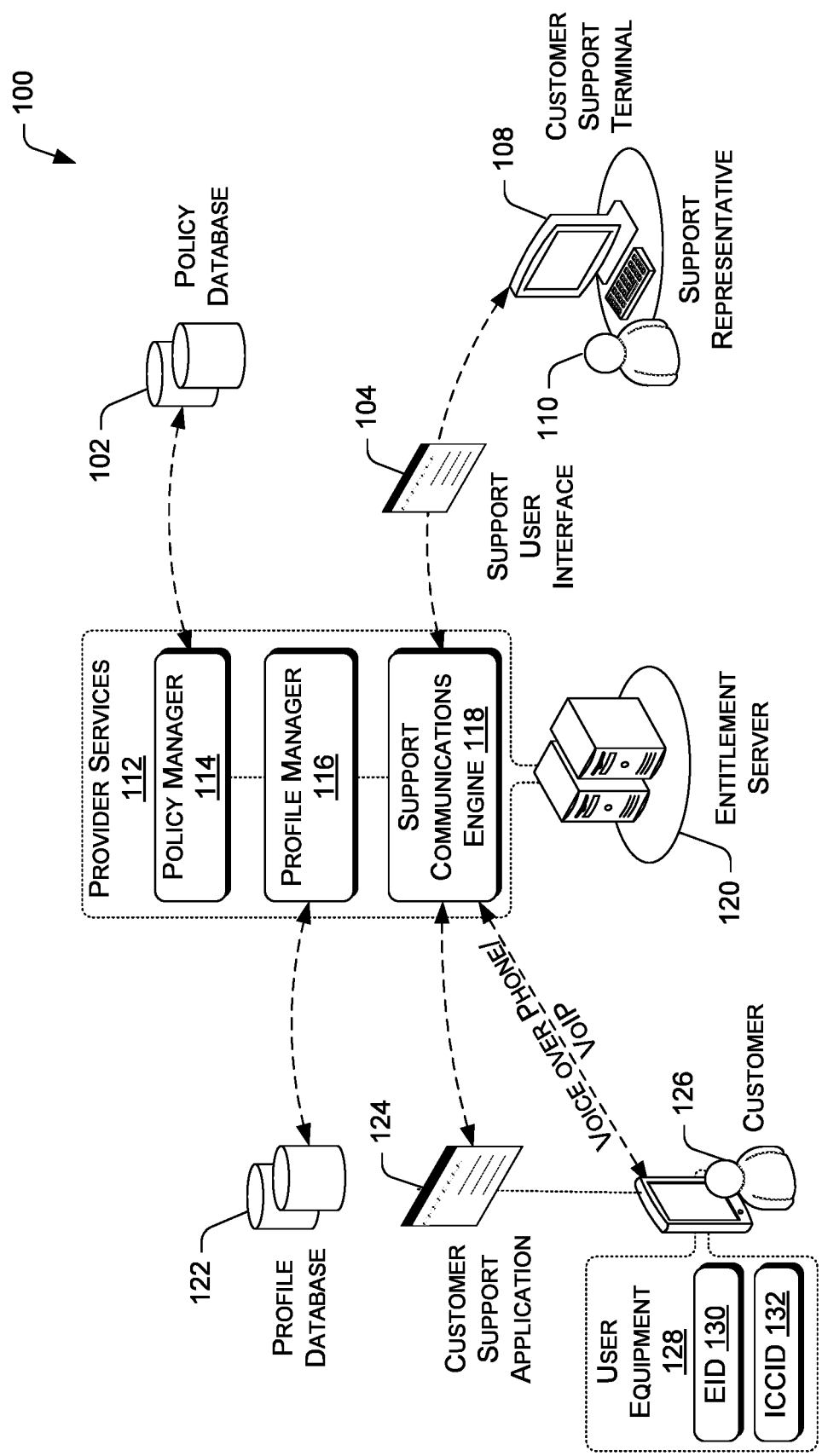
FIG. 1 illustrates example network architecture for managing subscription profiles within a eUICC for connectivity to one or more MNOs.

This disclosure is directed to techniques for determining eligibility for receiving and loading new profiles on a target user equipment and/or eUICC in a machine-to-machine (M2M) environment or a consumer device environment. In various embodiments, a customer's user equipment can have profiles loaded from eUICC manufacturers (EUMs), the profiles corresponding to data preparation (DP), enhanced DP (DP+), and/or secure routing (SR) in the SM, wherein at least one of the profiles comprises a prioritized profile owned by an MNO for connectivity to the MNO. The prioritized profile is a preferred profile that can be loaded onto the eUICC before other profiles that may also reside on the user equipment. The prioritized profile can be prepared during end-user contract finalization, depending upon embodiments. The profiles can be managed via a profile manager that is operated via an entitlement server that can be controlled via the MNO. MNOs can source profiles from multiple EUMs in order to simplify profile ordering.

To delete the prioritized profile and request a new profile in order to, for example, unlock the functionality of the user equipment, a customer associated with the user equipment can contact an MNO in any of a number of ways. For example, the MNO can enable customers to submit a request for a new profile via a website that is operated by the MNO. Additionally, or alternatively, a customer support representative of the MNO can interface with various customer support systems to enable the customer to call or engage in an online chat with a customer support representative. The customer support system can include a support communications engine that can be operated via the entitlement server.

The customer can be asked for a device identifier corresponding to the customer's user equipment, such as ICCID, EID, IMEI, and/or so forth, which the MNO can validate against a register of device identifiers, such as an equipment identification register (EIR) or another database. If the device identifier is valid, the MNO can identify a profile that corresponds to the device identifier and the request is provided to a policy manager to refer to one or more policies of the MNO that apply to the customer's profile. The policy manager can be operated via the entitlement server to manage the policies of the MNO, wherein the policies can reflect business priorities, plans, and decisions of the MNO.

Based on the one or more policies, the profile manager can determine whether the customer is eligible for a new profile. For example, the profile manager can determine that the customer is not eligible for a new profile in response to the user equipment being reported lost or stolen, in response to delinquency in payment for an account associated with the user equipment, or in response to expiration of a service plan associated with the user equipment. In various embodiments, the profile manager can determine whether the customer is eligible for a new profile on a case-by-case basis and request for policy overrides from the MNO as deemed necessary. If the customer is eligible for a new profile other than the prioritized profile, the functionality of user equipment can be unlocked and the MNO can notify the customer that the request for a new profile has been granted. Additionally, the MNO transmit instructions to the user equipment, via the website that is operated by the MNO or a customer support interface, to install the new profile on the eUICC. Profile status for deleted and/or new profiles can be managed via the profile manager.

The functionality of user equipment can be unlocked for any of a number of reasons. For example, an unlocked user equipment can be purchased outright without a service contract obligation that is tied to the user equipment. In another example, a user equipment can be unlocked after a customer's cellular subscription has lapsed and/or the terms of the customer's contract obligation have been fulfilled. The techniques described herein may be implemented in a number of ways. Example implementations are provided below with reference to the following figures.

Example Network Architecture

FIG. 1 illustrates example architecture for management of subscription profiles over the air based on eligibility criteria for customers. The architecture may include an entitlement server 120 of an MNO in communication with one or more network base stations via portions of a network backhaul and/or via other distributed portions of a network 100. The backhaul can employ any common wireline communication technology, such as optical fiber, coaxial cable, twisted pair cable, Ethernet cable, and powerline cable, along with any common wireless communication technology.

The network 100 can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), WiMax, and WiFi access technologies. The entitlement server 120 is in communication with one or more user equipment 128 that is associated with a customer 126, wherein the user equipment 128 comprises smartphones, mobile devices, personal digital assistants (PDAs) or other electronic devices having a wireless communication function that are capable of receiving inputs, processing the inputs, and generating output data. The user equipment 128 is connected to a telecommunication network utilizing one or more wireless base stations or any other common wireless or wireline network access technologies. The user equipment 128 comprises a eUICC comprising a corresponding embedded UICC identifier (EID) 130 and integrated circuit card identifier (ICCID) 132. Thus, a eUICC can be identified by its EID 130 and ICCID 132. The eUICC can comprise a plurality of profiles, wherein one of the plurality of profiles comprises a prioritized profile that can be generated and owned by the MNO.

The entitlement server 120 may include general-purpose computers, such as desktop computers, tablet computers, laptop computers, servers (e.g., on-premise servers), or other electronic devices that are capable of receiving inputs, processing the inputs, and generating output data. The entitlement server 120 may be operated by the MNO or a third-party entity that is working with the MNO. The entitlement server 120 may store data in a distributed storage system, in which data may be stored for long periods of time and replicated to guarantee reliability.

Accordingly, the entitlement server 120 may provide data and processing redundancy, in which data processing and data storage may be scaled in response to demand. Further, in a networked deployment, new entitlement servers 120 may be added. Thus, the entitlement server 120 can include a plurality of physical machines that may be grouped together and presented as a single computing system. Each physical machine of the plurality of physical machines may comprise a node in a cluster. The entitlement server 120 may also be in the form of virtual machines, such as virtual engines (VE) and virtual private servers (VPS).

The entitlement server 120 is configured to execute provider services 112 to grant or deny consumer initiated requests for loading a non-prioritized profile when a prioritized profile is currently loaded on the user equipment 128. In an example embodiment, the provider services 112 include a policy manager 114, a profile manager 116, and a support communications engine 118. Without limitation, the provider services can also provide a framework for additional functionalities such as customized reporting, analytics, inventory management, access control, and/or so forth, depending upon embodiments. The policy manager 114 is configured to add, delete, and edit policies for the MNO. The policy manager 114 can communicate with policy manager tools of the MNO or a third party entity that is responsible for setting or entering policies on behalf of the MNO. The policies can reflect business priorities, plans, and decisions relating to the telecommunication services provided by the MNO.

The policy manager 114 is in communication with a policy database 102, which stores and maintains MNO policies within a resident or distributed MNO data store, to enable customer accounts and affiliated user equipment to be managed by a corresponding MNO using the entitlement server. In various embodiments, the policy database 102 can also maintain customer account information (e.g., service plan information, billing information). The policy manager 114 can enforce the policies in the policy database 102 for facilitating profile management and profile loading schemes described herein. The policy manager 114 can add, delete, and edit policies stored in the policy database 102 on a predetermined scheduled basis. In this regard, the policy manager 114 can include a scheduling mechanism to periodically check and maintain available data in the policy database 102.

The profile manager 116 can determine, based on at least one or more policies from the policy database 102, whether to grant or deny a request to apply a new profile within the eUICC of the user equipment 128. For example, one or more policies can relate to customers' account status. The profile manager 116 can take into account a rate plan or account status associated with the user equipment 128, such as an account status retrieved from an equipment identity payment (EIP) server. If an account status shows delinquency in payment, the profile manager 116 can determine that the user equipment 128 associated with that account is not eligible to receive a new profile. If user equipment 128 is not eligible to receive a new profile within its eUICC, the profile manager 116 can cause a message (e.g., a SMS message, an IP message, etc.), to be delivered to the user equipment 128 informing the customer 126 of the user equipment 128 that the request for a new profile has been denied.

Conversely, if the customer 126 is eligible for a new profile within the eUICC of the user equipment 128, the profile manager 116 causes a message to be sent to the user equipment 128 informing the customer 126 of the user equipment 128 that the request has been granted. If the profile manager 116 cannot determine whether the user equipment 128 is eligible to receive a new profile within its eUICC (i.e., based on the one or more policies of the MNO), the profile manager 116 can cause a message to be delivered to the user equipment 128 informing the customer 126 of the user equipment 128 to contact the MNO. Additionally or alternatively, the profile manager 116 can cause a message to be delivered to a support representative 110 to contact the customer 126 of the user equipment 128 to resolve the customer's 126 request for a new profile.

The profile manager 116 is in communication with a profile database 122. In various embodiments, the profiles stored within the profile database 122 can comprise a provisioning profile, an operational profile, and/or a user profile. The provisioning profile includes information needed to establish a connection to an MNO. The operational profile includes MNO network access information for receiving telecommunication services. If there is no provisioning profile, the operational profile can act as the provisioning file, depending upon embodiments. The user profile can include user information, including user account information and user equipment information. The user profile may be included in an operational profile, depending upon embodiments.

Additionally, each profile can include information related to a corresponding SM and information for establishing a connection or for allowing communication with the SM, and an authentication credential and key information for performing an authentication (e.g., key exchanges). The authentication credential can comprise an Authentication and Key Agreement (AKA) scheme, public key infrastructure (PKI), and/or other authentication protocol such as multi-factor authentication and SAS certification. The profiles enable SMs to communicate with a respective user equipment or terminals that comprise eUICC having matching or corresponding profiles. More specifically, a user equipment can access an SM by using a profile selected from one of the profiles stored in the SM. In this way, the user equipment can communicate with an MNO using the SM. The eUICC automatically performs a user authentication with respect to a mobile communication network, to which the customer 126 has subscribed, by using the information stored in the eUICC, so that the customer 126 may conveniently receive telecommunication services through the user equipment 128.

The support communications engine 118 is configured to facilitate communication between the customer 126 at the user equipment 128 and a support representative 110 at a customer support terminal 108. In various embodiments, the support communications engine 118 provides a support user interface 104, which is accessible at the customer support terminal 108.

The user equipment 128 can include a trusted execution environment (TEE) connected by a trusted layer connector (TLC) and is configured to run any known operating system (e.g., Microsoft Windows®, Google Android®, Apple iOS®, Linux®, etc.). The operating system is configured to execute a customer support application 124 that at least partially resides on the user equipment 128. In a scenario where a customer wants to apply a new profile, the customer can contact its MNO via the customer support application 124. For example, the customer can call in via the customer support application 124 and speak directly with a support representative 110 at a customer support terminal 108 using voice over phone or voice over IP (VoIP).

In another example, the customer support application 124 can comprise a messaging feature that enables the customer 126 to send messages to the support representative 110 to engage in a chat or an online conversation. The customer support application 124 and/or the support communications engine 118 at the entitlement server 120 can automatically generate session notes upon completion of a customer support session. The session notes can be associated with the customer's account and stored in a data store such as a customer database and/or a policy database 102.

The customer support application 124 can comprise an application user interface, including a graphical user interface (GUI) for displaying information and notifications to the customer. For example, the customer support application 124 can include a customer web interface that allows the customer 126 of the user equipment 128 to utilize a dedicated customer account webpage of a corresponding MNO website, to perform various user-driven account management functions. For instance, the user-driven account management functions can include enabling the customer 126 to receive and view invoices and pay monthly service fees online using a secure online payment system of the MNO's website. Additionally, the customer 126 can view his or her account activities and user equipment associated with the customer's 126 account. In another example, a user-driven account management function of a customer's account webpage can facilitate the customer 126 requesting a new profile over the Internet. In this regard, the user equipment 128 may be locked based on a prioritized profile that is enabled, wherein the prioritized profile can be managed by the MNO or an SM, depending upon embodiments.

When initiating a request to apply a new profile on the eUICC of the user equipment 128, the customer 126 may be asked for a device identifier, such as an IMEI, EID 130, ICCID 132, which may be validated. More specifically, the provider services 112 at the entitlement server 120 can validate the device identifier against a register of device identifiers, such as an equipment identification register (EIR) or another database (not shown). If the device identifier validates (e.g., EID 130, ICCID 132), the request is provided to a policy manager 114 to refer to the policy database 102.

Based on the policies from the policy database 102, the profile manager 116 performs client privilege responsibility. For instance, the profile manager 116 can check if the customer 126 is allowed to modify one or more profiles (i.e., a prioritized profile) on the eUICC of the target user equipment 128. If the customer 126 is allowed to delete the prioritized profile and load a new profile on the eUICC of the user equipment 128, the profile manager 116 can transmit a message to the user equipment 128 to inform the customer 126 that the customer's 126 request was granted. Thus, a customer initiated request for replacing or deleting the prioritized profile must be reviewed for approval via the profile manager 116 of the entitlement server 120. Additionally, the profile manager 116 can check if a requested profile has been loaded and is available in one or more SMs before making a request for ordering profiles or EID. If the requested profile has not been loaded, the profile manager 116 can provide an error message in response to the customer's request for loading the requested profile.

Upon determining eligibility for loading a new profile, the customer support application 124 can provide instructions to a trustlet through the TLC and the trustlet may affect the locking or unlocking of the functionalities of the user equipment 128. The trustlet or another component of the TEE can provide a secure connection to an identification module such as a eUICC of the user equipment 128.

In some embodiments, the provider services 112 are operatively connected to at least one data store, wherein the data store can comprise a policy database 102, a profile database 122, and/or other data sources such as enterprise entities that can maintain, without limitation, EID, ICCID, subscription manager secure routing identifier (SMSR-ID), and/or so forth. The data store can comprise a home subscriber server (HSS) of a telecommunications network or a home location register (HLR) of the telecommunications network. The data store may store information relating to MNOs, SMs, customers 126, and/or so forth. In various embodiments, the data store can store a tree having a root node for security and that is configured to implement a protocol to coordinate with a third-party entity.

Example Computing Device Components

Figure 2:
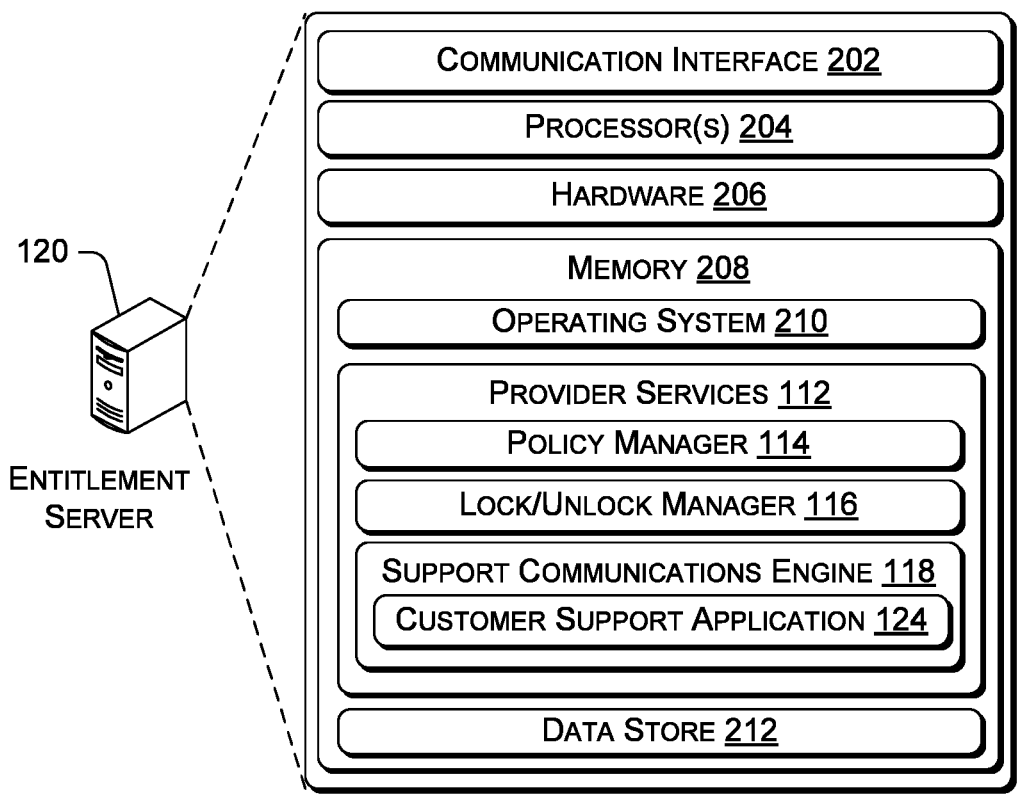
FIG. 2 is a block diagram showing various components of an illustrative computing device that implements provider services of an MNO.

FIG. 2 is a block diagram showing various components of an illustrative computing device, wherein the computing device can comprise an entitlement server 120. It is noted that the entitlement server 120 as described herein can operate with more or fewer of the components shown herein. Additionally, the entitlement server 120 as shown herein or portions thereof can serve as a representation of one or more of the computing devices of the present system. The entitlement server 120 may include a communication interface 202, one or more processors 204, hardware 206, and memory 208. The communication interface 202 may include wireless and/or wired communication components that enable the entitlement server 120 to transmit data to and receive data from other networked devices. In at least one example, the one or more processor(s) 204 may be a central processing unit(s) (CPU), graphics processing unit(s) (GPU), a both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the entitlement server 120.

The processors 204 and the memory 208 of the entitlement server 120 may implement an operating system 210, the provider services 112, and a data store 212. The data store 212 can comprise a data management layer that includes software utilities for facilitating the acquisition, processing, storing, reporting, and analysis of data from multiple data sources such as a policy database, a profile database, and/or so forth. In various embodiments, the data store 212 can interface with an API for providing data access.

The operating system 210 may include components that enable the entitlement server 120 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The provider services 112 include a policy manager 114, a profile manager 116, and a support communications engine 118 that comprises a customer support application 124. These components of the provider services 112 may include routines, program instructions, objects, and/or data structures that perform particular tasks or implement particular abstract data types.

The policy manager 114 is operatively connected to a policy database 102 in order to add, delete, update, and/or replace MNO policies. In this regard, the policy manager 114 can be in communication with an entity for creating and/or amending policies, wherein the entity can be a third party entity or an entity that is operated and/or controlled by the MNO (collectively, "policy-making entities"). The policy manager 114 can implement a scheduling mechanism to periodically check and retrieve newly available data from the policy-making entities. The policy manager 114 can handle the extraction and the handling of the policy data based on various configurations. For example, the configurations can include frequency of data retrieval, data retention period, and data disposal following an expiration of the data retention period.

The policy manager 114 is configured to identify one or more policies that apply to a customer operating a target user equipment, and therefore the customer's account. In this regard, a first set of policies can apply to a first customer operating a first target equipment, and a second set of policies can apply to a second customer operating a second target equipment, wherein the first set of policies and the second set of policies differ, although one or more of the policies within the first set of policies and the second set of policies can be the same such that the first set of policies and the second set of policies can at least partially overlap.

Upon identifying one or more policies that apply to the customer operating the target user equipment, the applicable policies can be passed to the profile manager 116 to enable the profile manager 116 to decide whether to grant the customer's request for applying a new profile onto the eUICC of the customer's user equipment and/or replace a prioritized profile that is enabled in the eUICC. In this way, the profile manager 116 provides accountability measurements to prevent SMs and/or consumers from readily loading different profiles on the eUICC, thereby preventing changes to service plans or subscriptions without receiving approval from the MNO while still allowing remote management. The profile manager 116 can communicate with the policy manager 114 in order to determine, based on at least one policy, whether the target user equipment is eligible for a new profile in various scenarios. If the target user equipment is eligible to receive a new profile, the profile manager 116 can instruct the user equipment to receive a new profile (e.g., from a new subscription manager).

In various embodiments, the profile manager 116 can implement a validation mechanism to ensure that the identifier (e.g., ICCID, EID) received from the target equipment matches user account information and the existing profile. For example, the profile manager 116 can validate the profile status to ensure that the profile is currently active and not already deleted. Further, the profile manager 116 can receive authentication parameters for remote provisioning from an SM and receive security credentials therefrom upon verification of authentication parameters. In some embodiments, the profile manager 116 can implement key exchanges and/or generate a secure digital identifier based on the security credentials.

The support communication engine 118, via the customer support application 124, may enable the MNO to communicate with customers that operate one or more user equipment of the present system. For example, the customer support application 124 may provide an interface for displaying a customer's account information and account activities for the customer's account. More specifically, the customer's account information can include information pertaining to all of the user equipment and each of the individual customers associated with the customer's account if the customer's account includes a primary account holder and one or more additional customers (i.e., secondary account holders). In this regard, the customer can add, delete, or replace products and/or services as well as other customers to the account. Additionally, the customer support application 124 can provide a secure payment portal for receiving payments (e.g., via a credit card) for a telecommunication service subscription. Moreover, the customer support application can provide access to the customer's service contract, which includes the service contract obligation associated with the customer's service plan.

The customer support application 124 is configured to enable the customer to contact a support representative at a customer support terminal. In various embodiments, the customer can call the support representative using a chat application, voice over phone, or voice over Internet protocol. In this way, the customer can request to remove a prioritized profile that is managed by the MNO or an SM and apply a new profile to the eUICC of the customer's user equipment. The customer support application 124 can save session notes generated from the customer's interactions with the support representative. The session notes can be archived to a user account database or the data store 212.

Example Processes

Figure 3:
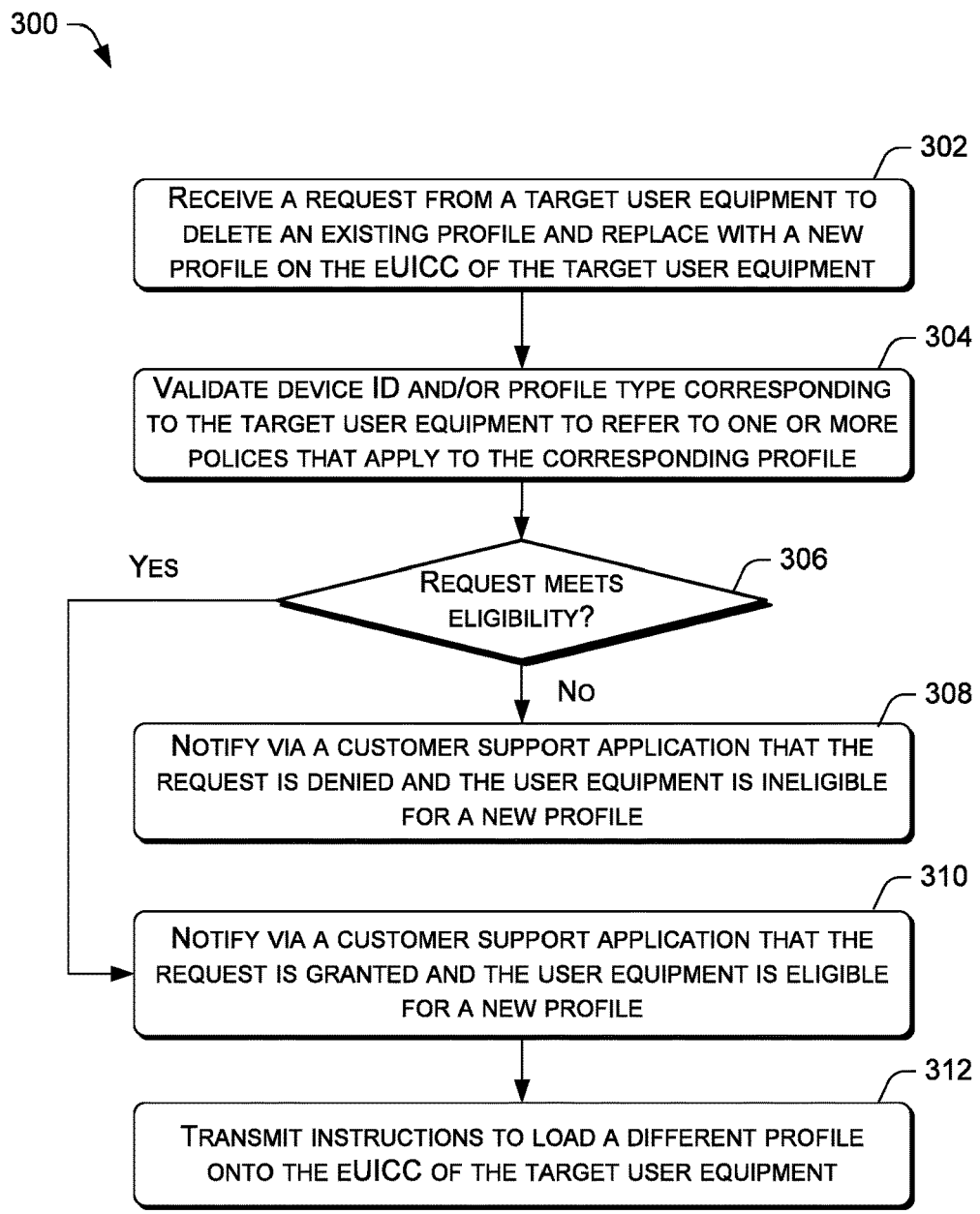
FIG. 3 is a flow diagram of an example process for determining eligibility for loading a new profile to a eUICC to manage the functionality of user equipment corresponding to the eUICC.

FIG. 3 presents an illustrative process 300 for remotely managing profiles. The process 300 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 300 is described with reference to the network 100 of FIG. 1.

FIG. 3 is a flow diagram of an example process 300 for determining, by an entitlement server, whether to apply a new profile and/or replace a prioritized profile on a eUICC of a target device based on policies and in response to a customer request, in accordance with embodiments of the disclosure. At block 302, an entitlement server receives and processes a request from a customer operating a target user equipment for deleting a prioritized profile and loading a new profile on a eUICC of the target user equipment. In various embodiments, the request can comprise deleting an existing profile and loading a prioritized profile on the eUICC of the user target equipment. The request includes a device identifier such as EID or ICCID that corresponds to the target user equipment. The eUICC that corresponds to the EID comprises a plurality of profiles loaded thereon. One of the profiles comprises a prioritized profile that can be managed by an MNO or an SM, depending upon embodiments.

The request can also include credentials in accordance with PKI-based authentication protocol and/or utilizes multi-factor authentication. The request can also include one or more SAS certificates. In various embodiments, the request utilizes an identifier correlating with an account that is associated with a plurality of user equipment and a plurality of users (e.g., a user identifier associated with a wireless service provider, a wireless carrier, a cellular company, a mobile network carrier, etc.). Preferably, the request is submitted to the MNO via a customer support application that can reside in whole or in part on the user equipment.

At block 304, the entitlement server validates a profile type that is enabled on the eUICC of the target user equipment to determine whether the enabled profile is a prioritized profile. Additionally, or alternatively, the entitlement server validates the device identifier corresponding to the target user equipment. In this case, the entitlement server can validate the device identifier against a register of device identifiers, such as an EIR or another database. If a profile type has not been provided, the profile manager identifies a profile type associated with the device identifier or other metadata attributes. If the device identifier is valid, the MNO can confirm that the device identifier is correctly associated with the one or more profiles that is loaded on the eUICC.

Thereafter, the request is provided to a policy manager to refer to one or more policies of the MNO that apply to the customer's profile.

At decision block 306, a profile manager determines whether the request meets the eligibility criteria as specified in the one or more policies. If the request does not meet the eligibility criteria ("no" response from the decision block 306), a support communications engine transmits a message to the customer denying the request via, for example, the customer support application, as indicated in block 308. If the request meets the eligibility criteria, ("yes" response from the decision block 308), the support communications engine transmits a message to the customer approving the request, as indicated in block 310. At block 312, the support communications engine can also transmit instructions to the target user equipment for loading a new profile. In various embodiments, the profile manager can retrieve a requested profile from a profile database and/or order an SM or the MNO to serve the eUICC of the target user equipment with the requested profile. In this regard, MNOs can provide metadata attributes (e.g., ICCID, profile type) associated with profile orders.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a request for deleting a prioritized profile loaded onto an embedded UICC (eUICC) corresponding to an embedded UICC identifier (EID) and an integrated circuit card identifier (ICCID) of a unique user equipment, the prioritized profile associated with an international mobile subscriber identifier (IMSI) and one or more policies;
   retrieving from a policy database, the one or more policies for deleting the prioritized profile on the eUICC;
   determining, based at least in part on the one or more policies, whether the prioritized profile on the eUICC is eligible to be deleted; and
   locking the user equipment to the IMSI in response to making a determination that the prioritized profile is ineligible to be deleted.

2. The one or more non-transitory computer-readable media of claim 1, wherein the request includes credentials in accordance with a public key infrastructure (PKI)-based authentication protocol.

3. The one or more non-transitory computer-readable media of claim 1, wherein the request utilizes a multi-factor authentication.

4. The one or more non-transitory computer-readable media of claim 1, wherein the request utilizes an identifier correlating with an account that is associated with a plurality of user equipment and a plurality of users.

5. The one or more non-transitory computer-readable media of claim 4, wherein the determining is based on a rate plan and account status associated with the account.

6. The one or more non-transitory computer-readable media of claim 1, wherein the request includes one or more Security Asset Service (SAS) certificates.

7. The one or more non-transitory computer-readable media of claim 1, wherein the one or more non-transitory computer-readable media includes a firewall.

8. The one or more non-transitory computer-readable media of claim 1, wherein the acts further comprise:
   securing a communication session between the one or more non-transitory computer-readable media and the user equipment.

9. The one or more non-transitory computer-readable media of claim 1, wherein the one or more non-transitory computer-readable media comprises an on-premise server.

10. The one or more non-transitory computer-readable media of claim 1, wherein the acts further comprise:
    receiving an additional request for loading a non-prioritized profile loaded onto the eUICC corresponding to the EID and the ICCID of the unique user equipment, the non-prioritized profile associated with one or more policies;
    determining, based at least in part on the one or more policies, whether the non-prioritized profile on the eUICC is eligible to be loaded onto the eUICC;
    unlocking the user equipment in response to making a determination that the non-prioritized profile is eligible to be loaded; and
    loading the non-prioritized profile in the eUICC.

11. The one or more non-transitory computer-readable media of claim 1, wherein the acts further comprise:
    reviewing eligibility criteria in the one or more policies, the eligibility criteria based on a rate plan and account status associated with a customer account corresponding to the user equipment.

12. The one or more non-transitory computer-readable media of claim 11, wherein the acts further comprise:
    identifying delinquency in payment for the customer account corresponding to the user equipment.

13. The one or more non-transitory computer-readable media of claim 1, wherein the acts further comprise:
    wherein the prioritized profile is managed by a mobile network operator (MNO).

14. The one or more non-transitory computer-readable media of claim 1, wherein the eUICC is stored in a data store, the data store comprising a home subscriber server (HSS) of a telecommunications network or a home location register (HLR) of the telecommunications network.

* * * * *